No. 657,336. Patented Sept. 4, 1900.
R. DALE.
SAW.
(Application filed Mar. 26, 1900.)
(No Model.)

Witnesses:
F. L. Ouraud.
E. P. Brunyer.

Inventor,
Raymond Dale.
By Lewis Bagger & Co.
Attorneys.

UNITED STATES PATENT OFFICE.

RAYMOND DALE, OF NEW CASTLE, COLORADO.

SAW.

SPECIFICATION forming part of Letters Patent No. 657,336, dated September 4, 1900.

Application filed March 26, 1900. Serial No. 10,164. (No model.)

*To all whom it may concern:*

Be it known that I, RAYMOND DALE, a citizen of the United States, residing at New Castle, in the county of Garfield and State of Colorado, have invented new and useful Improvements in Saws, of which the following is a specification.

My invention relates to saws; and the objects of the same are to provide a saw with groups of teeth relatively disposed, formed, and beveled in such a manner that the separate groups shall each be provided with clearance or drag teeth and cutting-teeth alternately arranged, the advantages of such construction and arrangement giving increased clearance, ease in operation, and greater speed relatively to the power required. I attain these objects and advantages by means of the construction shown in the accompanying drawings, which form a part of this specification, and in which—

Figure 1:
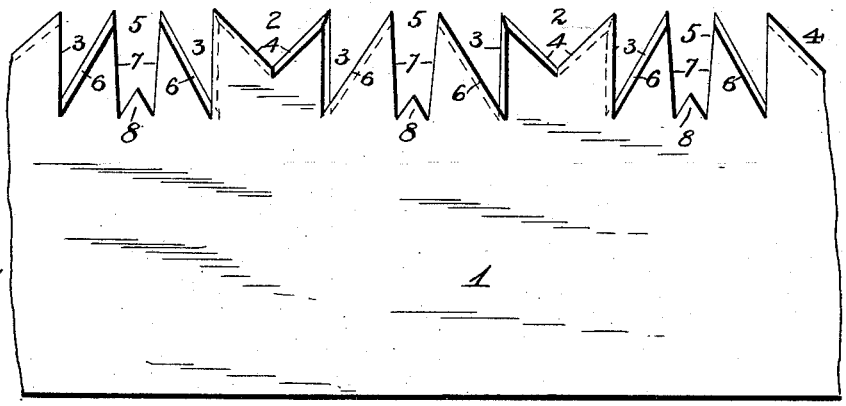
Figure 2:
Figure 3:
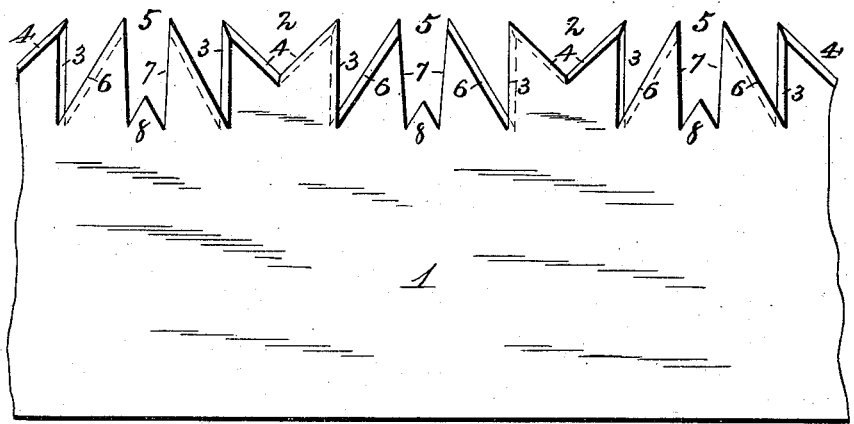

Figure 1 is a side view of a broken section of a saw-blade made in accordance with my invention. Fig. 2 is a plan view looking down upon the teeth. Fig. 3 is a view of the opposite side of the blade from that shown in Fig. 1.

Like numerals designate like parts in the different views.

The numeral 1 designates a saw-blade of any suitable character provided with teeth arranged as will now be described. The cutting-teeth 2 are formed in pairs, as shown, and these teeth are reversely beveled and provided each with a substantially-vertical edge 3 and an inclined edge 4. The edges 3 and 4 of each pair of said teeth are reversely beveled and oppositely set, as shown in Fig. 2. The drag or clearance teeth 5 are also arranged in contiguous pairs arranged alternately with the cutting-teeth. These drag or clearance teeth are provided with oppositely-inclined edges 6 for each pair, and these inclined edges are beveled upon the same side of the blade, and each alternate pair is beveled upon opposite sides of the blade, as shown. The contiguous edges 7 of the teeth 5 are plain or unbeveled, and said edges are slightly inclined or flare outwardly and are unset or occupy a plane coincident with the saw-blade. At the base of the edges 7 small $\Lambda$-shaped teeth 8 are formed, and these teeth are also in the same plane with the saw-blade and are not beveled.

It will be noticed that each alternate pair of cutting-teeth are reversely beveled, and each tooth in each pair is also reversely beveled, while the alternately-arranged pairs of drag or clearance teeth are reversely beveled, each pair being beveled on the same side of the saw-blade.

In operation the sawdust is carried out of the kerf by the teeth 5, the inclined edges 7 permitting the sawdust to easily drop out and the teeth 8 serving to prevent clogging and to push the dust out between the edges 7, as will be obvious.

Having thus fully described my invention, what I claim is—

1. A saw provided with cutting-teeth arranged in pairs, each tooth of a pair being reversely beveled and set, and each alternate pair being oppositely beveled, and intermediate pairs of clearance-teeth, each tooth of which has an inclined edge beveled on the same side of the blade, and plain inclined edges, and each alternate pair of said clearance-teeth being oppositely beveled, substantially as described.

2. A saw provided with cutting-teeth disposed in pairs, each tooth in a pair being reversely beveled and set, and each alternate pair being oppositely beveled, and intermediate pairs of clearance-teeth, each tooth of which has an inclined edge beveled on the same side of the blade and plain or unbeveled inclined edges, each alternate pair of said clearance-teeth being oppositely beveled, and a $\Lambda$-shaped drag-tooth between each pair of clearance-teeth, substantially as described.

In testimony whereof I have hereunto set my hand in presence of two subscribing witnesses.

RAYMOND DALE.

Witnesses:
C. H. SCHMUESER,
MAX L. SCHAYER.